United States Patent Office 3,641,117
Patented Feb. 8, 1972

3,641,117
PRODUCTION OF 2,2-DIMETHYL-1,3-PROPANE-DIOLMONO(HYDROXYPIVALATE)
Rolf Platz, Mannheim, and Franz Merger, Ludwigshafen (Rhine), Germany, assignors to Badische Anilin- & Soda-Fabrik Aktiengesellschaft, Ludwigshafen (Rhine), Germany
No Drawing. Filed Aug. 21, 1968, Ser. No. 754,484
Claims priority, application Germany, Aug. 25, 1967, P 16 43 650.3
Int. Cl. C07c *69/66*
U.S. Cl. 260—484 R          4 Claims

ABSTRACT OF THE DISCLOSURE

Production of 2,2 - dimethyl-1,3-propanediolmono(hydroxypivalate) by disproportionation of hydroxypivalaldehyde. The product is a valuable starting material for the production of synthetic resins and plasticizers.

---

This invention relates to the production of 2,2-dimethyl-1,3 - propanediolmono(hydroxypivalate) by disproportionation of hydroxypivalaldehyde.

It is known that hydroxypivalaldehyde disproportionates into 2,2-dimethyl-1,3-propanediolmono(hydroxypivalate) in the presence of magnesium iodoethyl (Monatshefte für Chemie, volume 25, pages 865 et seq. (1904)), in the presence of potassium carbonate at elevated temperature (Hagemeyer/De Croes, The Chemistry of Isobutyraldehyde, Tennessee Eastman Company 1953, page 17) or without a catalyst at elevated temperature (U.S. patent specification No. 3,057,911). The purity of the end product in the said methods is unsatisfactory. For example yellowish polyesters are obtained when esters thus prepared are used as starting materials; these polyesters are unsuitable for special uses in the plastics industry.

The object of the present invention is to provide a new process for the production of 2,2-dimethyl-1,3-propanediolmono(hydroxypivalate) in a good yield and purity and high space-time yields of pure end product.

This and other objects of the invention are achieved and 2,2-dimethyl-1,3-propanediolmono(hydroxypivalate) is advantageously obtained by disproportionation of hydroxypivalaldehyde at elevated temperature by carrying out the reaction in the presence of calcium, barium or strontium hydroxide.

The disproportionation may be represented by the following equation:

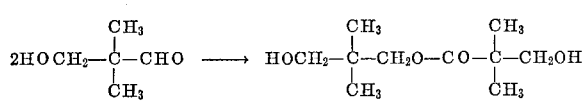

As compared with the prior art methods, the process according to this invention surprisingly gives 2,2-dimethyl-1,3-propanediolmono(hydroxypivalate) in good yields, in better purity and accordingly in higher space-time yields of pure end product.

The starting hydroxypivalaldehyde may be used in purified form or in the form of the crude end product of the reaction of isobutyraldehyde with formaldehyde.

The reaction is carried out in the presence of a hydroxide of barium, strontium or, preferably, calcium.

The compounds may also be supplied to the reaction together with catalyst carriers, for example silicate, silica gel or active carbon. The metal hydroxides are used in general in an amount of 0.1 to 20% by weight, preferably 1 to 5% by weight, with reference to hydroxypivalaldehyde. They are advantageously used in finely divided form, for example in a particle size of from 0.01 to 0.3 mm. The reaction is carried out as a rule at a temperature of from 50° to 170° C., preferably from 90° to 140° C., continuously or batchwise. Inert solvents can be used, but are not necessary.

The reaction may be carried out for example as follows: a mixture of hydroxypivalaldehyde and one of the said alkaline earth metal compounds is kept at the reaction temperature for from four to thirty hours. The reaction mixture is then filtered and the filtrate is subjected to fractional distillation, 2,2 - dimethyl - 1,3 - propanediolmono (hydroxypivalate) being separated at a boiling point of 152° C. at 10 mm.

The compound which can be prepared by the process according to this invention is a valuable starting material for the production of synthetic resins and plasticizers. As regards its use, reference is made to the above-mentioned publications. For example it can be polycondensed according to the process described in U.S. patent specification No. 3,320,336 with unsaturated dicarboxylic acids, transparent plastics which are resistant to heat, oxidation and hydrolysis being obtained.

The invention is illustrated by the following examples in which parts are by weight.

EXAMPLE 1

600 parts of hydroxypivalaldehyde to which 18 parts of powdered calcium hydroxide have been added is heated at 130° C. for six hours while stirring. The calcium hydroxide is then filtered off from the mixture and the filtrate is distilled at 10 mm. 425 parts (equivalent to 70.8% of the theory) of 2,2-dimethyl-1,3-propanediolmono(hydroxypivalate) having a boiling point of 152° C. at 10 mm. is obtained.

If an analogous procedure is adopted in which no calcium hydroxide is added, only 304 parts (50.7% of the theory) of 2,2 - dimethyl-1,3-propanediolmono(hydroxypivalate) is obtained.

EXAMPLE 2

600 parts of hydroxypivalaldehyde is heated at 130° C. with an addition of 30 parts of powdered barium hydroxide for six hours while stirring. The barium hydroxide is then filtered off and the filtrate is fractionated at 10 mm. 372 parts (62% of the theory) of 2,2-dimethyl-1,3-propanediolmono(hydroxypivalate) is obtained having a boiling point of 152° C. at 10 mm.

EXAMPLE 3

600 parts of hydroxypivaldehyde is heated at 130° C. with an addition of 40 parts of powdered strontium hydroxide for six hours while stirring. Strontium hydroxide is filtered off and the filtrate is fractionated. 348 parts (58% of the theory) of 2,2-dimethyl-1,3-propanediol-mono(hydroxypivalate) having a boiling point of 152° C. at 10 mm. is obtained.

When the 2,2-dimethyl-1,3-propanediolmono(hydroxypivalate) obtained according to Examples 1 to 3 is heated for several hours at 190° C. with a stoichiometric amount of maleic anhydride, a polyester is obtained having an iodine color number of less than 1 whereas the ester prepared by the prior art methods gives a polyester having an iodine color number of from 3 to 5. (Iodine color number determined according to German Standard DIN 6162 "Iodine Colour Scale").

We claim:
1. A process for the production of 2,2-dimethyl-1,3-propanediolmono(hydroxypivalate) by disproportionation of hydroxypivalaldehyde at a temperature of from 50° to

170° C. wherein the reaction is carried out in the presence of from 0.1 to 20% by weight with reference to said hydroxypivalaldehyde of a hydroxide of calcium, barium or strontium.

2. A process as claimed in claim 1 wherein said metal hydroxide is in the form of particles having a size of from 0.01 to 0.3 mm.

3. A process as claimed in claim 1 carried out with the metal hydroxide in an amount of from 1 to 5% by weight with reference to hydroxypivalaldehyde.

4. A process as claimed in claim 1 carried out at a temperature of from 90° to 140° C.

References Cited

UNITED STATES PATENTS

| | | | |
|---|---|---|---|
| 3,057,911 | 10/1962 | Finch | 260—484 |
| 3,091,632 | 5/1963 | Hagemeyer | 260—476 |
| 3,114,766 | 12/1963 | Knopf | 260—484 X |

LEWIS GOTTS, Primary Examiner

P. J. KILLOS, Assistant Examiner

U.S. Cl. X.R.

260—78.4 E